3,408,425
S-PHENYLMERCAPTOCYANOMETHYL PHOSPHORIC -ONIC OR -INIC ACID ESTERS
Hans-Gerd Schicke, Wuppertal-Elberfeld, and Gerhard Schrader, Wuppertal-Cronenberg, Germany, assignors to Farbenfabriken Bayer Aktiengesellschaft, Leverkusen, Germany, a German corporation
No Drawing. Filed Apr. 21, 1965, Ser. No. 449,877
Claims priority, application Germany, Apr. 23, 1964, F 42,700
17 Claims. (Cl. 260—940)

The present invention relates to particular phosphorus-containing esters, to compositions containing the same, as well as to methods for their production and use.

The particular new esters according to the present invention are compounds having the general formula

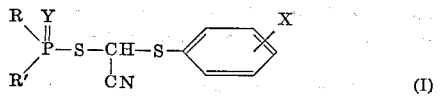
(I)

in which R and R', which may be the same or different, are alkyl, alkoxy, amino, alkylamino or dialkylamino radicals, or aryl radicals which may be substituted by halogen atoms and/or alkyl groups, X is a hydrogen or halogen atom or alkyl radical, and Y is an oxygen or sulfur atom.

The symbols R and R' preferably represent alkyl, alkoxy, alkylamino or dialkylamino groups containing 1 to 4 carbon atoms in the particular alkyl chains, as well as phenyl radicals which may be substituted by 1 to 3 chlorine atoms and/or alkyl radicals containing 1 to 4 carbon atoms; and X preferably denotes a hydrogen, chlorine or bromine atom or a methyl radical.

It is an object of the present invention to provide particular phosphorus-containing esters possessing excellent pesticidal properties, especially insecticidal and acaricidal properties.

It is another object of the present invention to provide phosphorus-containing thio ester compounds which possess an outstanding activity against resistant spider mites in particular as well as against ticks and caterpillars.

It is a still further object of the present invention to provide particular phosphorus-containing thio ester compounds which may be used for pest control and/or plant control purposes.

It is a still further object of the present invention to provide compositions of phosphorus-containing esters with dispersible carrier vehicles in admixture usable for pest control purposes.

It is a still further object of the present invention to provide a process for producing such phosphorus-containing ester compounds which is versatile and efficient.

It is a still further object of the present invention to provide methods for the use of such phosphorus-containing ester compounds for pest control purposes, and especially methods of combating insects and acarids, such as spider mites, ticks and caterpillars by applying to such pests pesticidal amounts of the foregoing phosphorus-containing esters per se or in the form of compositions with carrier vehicles, and/or in admixture with one or more compatible pest control agents of the convventional type.

Other and further objects of the present invention will become apparent from a study of the within specification and accompanying examples.

It has been found in accordance with the present invention that in phenylmercapto-cyanomethyl halides of the general formula

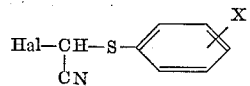
(II)

in which X has the same meaning as above and Hal is a halogen atom, the halogen atom can readily be exchanged for the radical of a thiol- or thionothiol-phosphoric, -phosphonic or -phosphinic acid, i.e. where compounds of general Formula II are reacted with compounds of the general formula

(III)

in which R, R' and Y are the same as defined and M is a monovalent metal equivalent or ammonium. Such monovalent radical defined by M includes more and the like metals, such as sodium, potassium, lithium, and the like, as well as the ammonium salt, and accordingly the thio phosphorus acid salts in question as covered by Formula III above may be considered alkali salts, the term alkali salt as used herein, i.e., both in the specification and the claims, defining the alkali metal salts and the ammonium salt as specified.

The course of the instant reaction can be illustrated by means of the following equation:

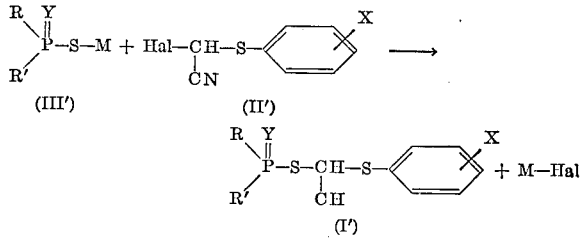

in which the symbols M, R, R', X and Y have the same meaning as above and Hal represents a halogen atom, preferably a chlorine or bromine atom.

The reaction in accordance with the present invention is preferably carried out at temperatures substantially between about room temperature and the boiling temperature of the reaction mixture, and preferably in the presence of a suitable solvent. Aliphatic ketones, especially dialkyl ketones, for example, $C_3$-$C_{12}$ dilower alkyl ketones, such as acetone, methyl ethyl ketone, diethyl ketone, methyl isobutyl ketone, methyl isopropyl ketone, and the like, and aliphatic nitriles, such as alkane nitriles, for example $C_1$-$C_4$ lower alkyl cyanides, and especially acetonitrile, propionitrile, butyronitrile, and the like, as well as water and mixtures of water with the said inert solvents, have proved suitable for this purpose and the temperature range from about 20 to 80° C. has been found to be especially advantageous for carrying out the process according to the present invention, particularly where such temperature is below the boiling temperature of the corresponding reaction mixture.

It is also expedient to continue heating the reaction mixture for some time, i.e. for about 1 to 3 hours, while stirring, after the starting components have been added together. In this case, the products are obtained in particularly good yields and with an excellent degree of purity.

It is also possible, instead of starting from the above-mentioned thiol- or thionothiol-phosphoric, phosphonic, or -phosphinic acid salts, to use the corresponding free acids and to react these in the presence of acid binding agents, such as alkali metal alcoholates, especially alkali metal alkoxides, including $C_1$-$C_3$ lower alkylolates, such as sodium-, potassium-, etc., -methoxides, -ethoxides, -propoxides, and the like, as well as alkali metal carbonates, such as sodium carbonate, potassium carbonate, and the like, as well as tertiary amines, and especially tertiary alkylamines, such as trimethylamine, triethylamine, diethyl-monomethylamine, tripropylamine, tributylamine, dimethyl-cyclohexylamine, as well as tertiary mixed alkyl-arylamines, such as dimethyl aniline, mononuclear arylamines, such as pyridine, and the like. More particularly, $C_1$-$C_6$ trialkylamines having various straight and branched chain substituents may be used, including the substituents methyl, ethyl, n-propyl, iso-propyl, n-butyl, iso-butyl, sec.-butyl, tert.-butyl, the amyls, the hexyls, and the like, as well as $C_5$-$C_6$ tri(cyclo lower alkyl) substituted amines including the substituents cyclopentyl, cyclohexyl, and the like, and the corresponding mixed dialkyl and monocycloalkyl substituted-, and monoalkyl and dicycloalkyl substituted-tertiary amines, wherein the alkyl substituent or substituents and the cycloalkyl substituent or substituents include the foregoing substituents.

The phenylmercapto-cyanomethyl halides required as starting materials for the reaction according to the present invention can be prepared in known manner by halogenation of the corresponding phenylmercapto-methyl cyanides according to the following equation:

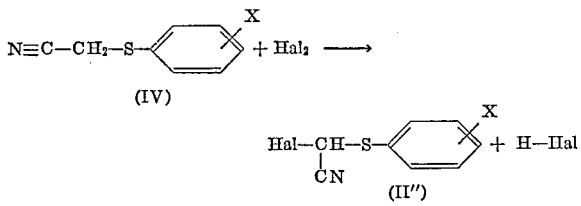

Preferred halogenating agents are sulfuryl chloride or elementary chlorine.

Some of the new esters produced according to the present invention are obtained in the form of solid crystalline compounds having a sharp melting point which can be recrystallized from conventional solvents, while some of them are colorless to brown colored, water-insoluble oils which cannot be distilled without decomposition, even under strongly reduced pressure.

The compounds of the present invention possess excellent pesticidal properties, especially insecticidal and acaricidal properties. These compounds are particularly distinguished by an outstanding activity against resistant spider mites, ticks and caterpillars and can, therefore, be used as pest control and/or plant protective agents.

The new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins, (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

In general, the compositions or formulations contain substantially between about 0.1 and 95 percent by weight of the active compound, and preferably substantially between about 0.5 and 90 percent by weight.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders and granulates which are thus ready for use.

The following examples are given for the purpose of illustrating, while not limiting, the present invention.

Example 1

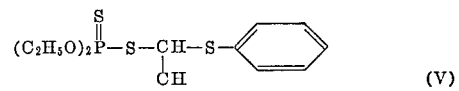

41 grams (0.2 mol) of ammonium O,O-diethylthionothiol-phosphate are dissolved in 300 cc. of acetonitrile, and 36.7 grams of phenylmercapto-cyanomethyl chloride, dissolved in 50 cc. of acetonitrile, are added dropwise to the resulting solution at 70° to 80° C. The reaction mixture is subsequently stirred at the stated temperature for one hour, then cooled and poured into 1000 cc. of water. The precipitated oil is taken up with methylene chloride, the resulting methylene chloride solution washed with water, the organic phase separated, and the solvent distilled off. All volatile components are finally removed under reduced pressure at a bath temperature of 50 to 60° C. 63.5 grams (95% of the theoretical) of O,O-diethyl - thionothiol - phosphoric acid - S - (phenylmercaptocyanomethyl) ester are obtained in the form of a clear brown oil.

*Analysis.*—Calculated for a molecular weight of 333: P, 9.32%. Found: P, 8.90%.

Example 2

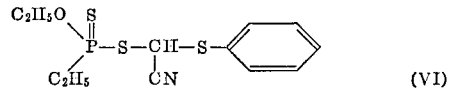

42 grams (0.2 mol) of potassium ethyl-O-ethylthionothiol-phosphonate are dissolved in 300 cc. of acetonitrile. 36.7 grams of phenylmercapto-cyanomethyl chloride, dissolved in 50 cc. of acetonitrile, are added dropwise to the resulting solution at boiling temperature, the reaction mixture is subsequently stirred at the stated temperature for one hour, and then cooled to 20° C. and poured into 1000 cc. of water. The separated oil is taken up with methylene chloride, the resulting methylene chloride solution dried, and the solvent distilled off. The last residues of volatile components are finally removed under reduced pressure at a bath temperature of 50 to 60° C. The resulting yield of ethyl-O-ethyl-thionothiol-phosphonic acid-S-(phenylmercapto-cyanomethyl) ester is 46 g. (73% of the theoretical).

*Analysis.*—Calculated for a molecular weight of 317: P, 9.78%. Found: P, 10.27%.

Example 3

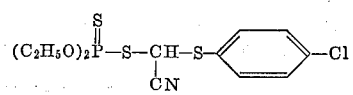
(VII)

A solution of 41 g. (0.2 mol) of ammonium O,O-diethyl-thionothiol-phosphate in 250 cc. of acetonitrile is mixed at 70 to 80° C. with 43.6 g. of 4-chloro-phenyl-mercapto-cyanomethyl chloride, dissolved in 100 cc. of acetonitrile. The reaction mixture is subsequently stirred at the stated temperature for one hour and, after cooling to 20° C., poured into 1000 cc. of water. The separated oil is taken up with methylene chloride, the resulting methylene chloride solution dried, and the solvent distilled off. The residue solidifies in crystalline form after standing for some time. The O,O-diethyl-thionothiol-phosphoric acid - S - (4 - chlorophenylmercapto-cyanomethyl) ester formed has a melting point of 51° C., after recrystallization from ligroin. The yield is 70 g. (95% of the theoretical).

*Analysis.*—Calculated for a molecular weight of 367.5: P, 8.44%; S, 26.15%; N, 3.82%, Cl, 9.66%. Found: P, 8.42%; S, 26.14%; N, 4.02%; Cl, 9.60%.

Example 4

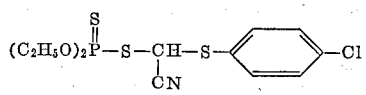
(VII′)

41 grams (0.2 mol) of ammonium O,O-diethyl-thionothio-phosphoric acid are dissolved in 200 cc. of water. The resulting solution is added dropwise at 20° C. to 43.6 g. of 4-chlorophenylmercapto-cyanomethyl chloride, dissolved in 200 cc. of acetonitrile. The mixture is allowed to react at the stated temperature for a further three hours, then mixed with 600 cc. of water, and the separated oil taken up with methylene chloride. The methylene chloride solution which results is dried and the solvent distilled off. The residue solidifies in crystalline form after standing for some time. The O,O-diethyl-thionothiol-phosphoric acid-S-(4-chlorophenylmercapto-cyanomethyl) ester obtained melts at 52° C. The yield is 62 g. (84.5% of the theoretical).

The following compounds can be prepared in an analogous manner:

Example 5

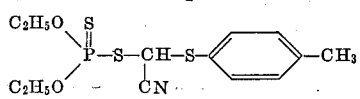

41 g. (0.2 mol) of ammonium O,O-diethylthionothiol-phosphate are dissolved in 300 cc. of acetonitrile. This solution is added dropwise at 30° C. to 39.5 grams of 4-methyl-ühenylmercapto-cyanomethyl-chloride dissolved in 300 cc. of acetonitrile. The reaction mixture is stirred for one hour at 30° C. and subsequently for a further hour at 50 to 60° C. The precipitated salt is then filtered off with suction, the solvent is distilled off under reduced pressure and the residue is dissolved in 500 cc. of methylene chloride. The methylene chloride solution is washed twice with water, dried and the solvent is distilled off in a vacuum. The O,O-diethylthionothiol-phosphoric acid-S-(4-methyl-phenylmercapto-cyanomethyl) ester is obtained in the form of a brown oil with the refractive index $n_{25}{}^D = 1.5735$. The yield amounts to 64.2 grams (92.5% of the theoretical).

*Analysis.*—Calculated for a molecular weight of 347: N, 4.04%; S, 27.72%; P, 8.92%. Found: N, 4.07%; S, 27.19%; P, 8.59%.

The following compounds can be prepared in an analogous manner:

| Constitution | Refractive index $n_{25}{}^D$ |
|---|---|
| (CH₂O)(CH₃O)P(S)—S—CH(CN)—S—C₆H₄—CH₃ | 1.5820 |
| (C₂H₅O)₂P(O)—S—CH(CN)—S—C₆H₄—CH₃ | 1.5489 |
| (C₂H₅)(C₂H₅O)P(S)—S—CH(CN)—S—C₆H₄—CH₃ | 1.5865 |

Example 6

The excellent insecticidal and acaricidal activity of the inventive products upon application against normally sen-

| | Constitution | Calculated (percent) | Found (percent) |
|---|---|---|---|
| (VIII) | (C₂H₅O)₂P(O)—S—CH(CN)—S—C₆H₅ | P, 9.78<br>S, 20.2 | P, 9.32<br>S, 19.02 |
| (IX) | (C₂H₅O)₂P(O)—S—CH(CN)—S—C₆H₄—Cl | P, 8.83<br>S, 18.2<br>N, 3.98 | P, 8.07<br>S, 17.78<br>N, 4.27 |
| (X) | (C₂H₅O)(C₂H₅)P(S)—S—CH(CN)—S—C₆H₄—Cl | P, 8.82<br>S, 27.36<br>N, 3.98 | P, 8.83<br>S, 26.96<br>N, 3.96 |
| (XI) | (CH₃O)₂P(S)—S—CH(CN)—S—C₆H₄—Cl | P, 9.14<br>N, 4.12 | P, 8.58<br>N, 3.85 |
| (XII) | (C₆H₅)(C₂H₅O)P(S)—S—CH(CN)—S—C₆H₄—Cl | P, 7.75<br>Cl, 8.87 | P, 8.07<br>Cl, 9.08 |
| (XIII) | (CH₃)₂P(S)—S—CH(CN)—S—C₆H₄—Cl | M.P. 81° C. | | sible and resistent spider mites as well as against ticks and caterpillars is to be seen from the following test results.

phenyl, -ethylphenyl, -tert.-butylphenyl, and mixed mono-, di-, and tri-$C_1$–$C_4$ alkyl-substituted phenyls, such as dimethyl-ethyl-phenyl, diethyl-methyl-phenyl, di-

| Compound (constitution) | Insecticidal and acaricidal activity when applied against— | | | | | | | |
|---|---|---|---|---|---|---|---|---|
| | Spider mites | | | | Ticks | | Caterpillars | |
| | Normally sensible | | Resistent | | Active ingredient (percent) | Killing rate (percent) | Active ingredient (percent) | Killing rate (percent) |
| | Active ingredient (percent) | Killing rate (percent) | Active ingredient (percent) | Killing rate (percent) | | | | |
| $\begin{array}{c}C_2H_5O\\ \phantom{C_2H_5O}\diagdown\\ \phantom{C_2H_5O}\phantom{\diagdown}P\\ \phantom{C_2H_5O}\diagup\\ C_2H_5O\end{array}\begin{array}{c}S\\ \|\\ -S-CH-S-\langle\phantom{x}\rangle\\ |\\ CN\end{array}$ | 0.0001 | 100 | 0.02 | 90 | 0.025<br>0.01 | 100<br>80 | 0.01 | 100 |
| $\begin{array}{c}C_2H_5O\\ \phantom{C_2H_5O}\diagdown\\ \phantom{C_2H_5O}\phantom{\diagdown}P\\ \phantom{C_2H_5O}\diagup\\ C_2H_5O\end{array}\begin{array}{c}S\\ \|\\ -S-CH-S-\langle\phantom{x}\rangle-Cl\\ |\\ CN\end{array}$ | 0.001<br>0.00016 | 100<br>80 | 0.004 | 100 | 0.0025<br>0.0005 | 100<br>65 | 0.001 | 70 |
| $\begin{array}{c}C_2H_5O\\ \phantom{C_2H_5O}\diagdown\\ \phantom{C_2H_5O}\phantom{\diagdown}P\\ \phantom{C_2H_5O}\diagup\\ C_2H_5O\end{array}\begin{array}{c}S\\ \|\\ -S-CH-S-\langle\phantom{x}\rangle-CH_3\\ |\\ CN\end{array}$ | ---------- | ---------- | 0.01<br>0.001 | 100<br>60 | 0.0025 | 90 | 0.01 | 100 |

The tests have been carried out as follows: aqueous dilutions of the above compounds have been prepared by admixing them with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentration indicated in the preceding paragraphs.

(a) Against spider mites (contact insecticidal action). Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out about 48 hours.

(b) Against ticks. 10 female ticks of the type *Boophilus microplus* each are placed into mull bags which are brought into a solution prepared as described above while moving them continuously. After 1 minute the mull bags are taken off the active solutions and put into glass dishes in which filter paper is placed upon dry filter paper. Evaluation occurred after 24 hours, 48, 72 and eventually 96 or 120 hours.

(c) Against caterpillars of the species *Plutella maculipennis*. White cabbage shoots heavily infested with caterpillars were sprayed drip wet with an insecticidal solution as prepared above in a concentration as shown above. Evaluation occurred after 4 days.

Preferably, R and R' each respectively represents:

$C_1$–$C_4$ alkyl, such as methyl, ethyl, n-propyl, iso-propyl, n-butyl, iso-butyl, sec.-butyl, tert.-butyl, and the like;

$C_1$–$C_4$ alkoxy, such as methoxy, ethoxy, n-propoxy, iso-propoxy, n-butoxy, isobutoxy, sec.-butoxy, tert.-butoxy, and the like;

unsubstituted amino;

$C_1$–$C_4$ alkylamino, such as methylamino, ethylamino, n-propylamino, iso-propylamino, n-butylamino, iso-butylamino, sec.-butylamino, tert.-butylamino, and the like;

di-$C_1$–$C_4$ alkylamino, such as dimethylamino, diethylamino, di-n-propylamino, di-iso-propylamino, di-n-butylamino, di-iso-butylamino, di-sec.-butylamino, di-tert.-butylamino, methyl-ethylamino, methyl-propylamino, ethyl-propylamino, methyl-butylamino, ethyl-butylamino, propyl-butylamino, and the like;

mononuclear aryl having 6 ring carbon atoms, such as phenyl, and the like;

mononuclear halo-substituted aryl having 6 ring carbon atoms, such as chlorophenyl, dichlorophenyl, trichlorophenyl, and the like;

mononuclear $C_1$–$C_4$ alkyl-substituted aryl having 6 ring carbon atoms, such as mono-, di-, and tri- -methylmethyl-propyl-phenyl, di-propyl-butyl-phenyl, and the like.

In the same way, preferably, X represents hydrogen, chloro, bromo, or lower alkyl, especially $C_1$–$C_4$ alkyl, such as methyl, ethyl, n-propyl, iso-propyl, n-butyl, iso-butyl, sec.-butyl, tert.-butyl, but in the case of lower alkyl, most preferably methyl.

More particularly, R and R' represent methyl, ethyl, methoxy, ethoxy, and phenyl, while Y is oxygen or sulfur, and X is hydrogen or chloro or methyl.

Thus, in accordance with the present invention a versatile and efficient process may now be provided for the production of phosphorus-containing thio esters of Formula I set forth above, in which in particular R and R' each respectively is a member selected from the group consisting of alkyl, alkoxy, amino, alkylamino, dialkylamino, aryl, haloaryl, and alkylaryl, X is selected from the group consisting of hydrogen, halogen, and alkyl, and Y is selected from the group consisting of oxygen and sulfur, which comprises reacting a phenylmercapto-cyanomethyl halide of the general Formula II above, in which X is the same as defined above and Hal is a halogen atom, with a thio compound of the general formula

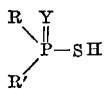

in which R, R', and Y are each the same as defined above, in the presence of an acid binding agent, or with thio phosphorus acid salt of the general Formula III above, in which R, R' and Y are the same as defined above and M is a monovalent equivalent of a metal cation or ammonium, and especially an alkali cation equivalent such as an alkali metal cation or the ammonium ion, and recovering the corresponding phosphorus-containing thio ester formed.

Such thio esters which may be prepared in the foregoing manner are usable as pesticidal preparations per se or in formulations and compositions with carrier vehicles, with the thio ester being used in a pesticidal amount.

More specifically, the present invention contemplates a method of combating pests which comprises applying to such pests and their habitat a pesticidally effective amount of such thio ester, i.e., which is sufficient to combat the pests in question. All of the aforementioned compounds generically, subgenerically, and specifically coming within the present invention as defined herein possess the desired pesticidal properties, especially against resistant spider mites, ticks and caterpillars as stated. Particular types of compounds usuable in accordance with the invention, therefore, include O,O-di($C_1$–$C_4$-alkyl)-thionothiol-phosphoric acid-S-(phenylmercapto-cyanomethyl) ester, O,O-di($C_1$–$C_4$ alkyl)-thionothiol-phosphoric acid -S-(4-chlorophenylmercapto-cyanomethyl) ester, O,O-di($C_1$–$C_4$ alkyl)-thiol-phosphoric acid-S-(phenylmercapto-cyanomethyl) ester, O,O-di($C_1$–$C_4$ alkyl)-thiol-phosphoric acid-S-(4-chlorophenylmercaptocyanomethyl) ester, ($C_1$–$C_4$ alkyl)-O-($C_1$–$C_4$ alkyl)-thionothiol-phosphonic acid-S-(phenylmercapto-cyanomethyl) ester, ($C_1$–$C_4$ alkyl)-O-($C_1$–$C_4$ alkyl)-thionothiol-phosphonic acid-S-(4-chlorophenylmercapto-cyanomethyl) ester, di($C_1$–$C_4$ alkyl)-thionothiol-phosphinic acid-S-(4-chlorophenylmercapto-cyanomethyl) ester, phenyl-O-($C_1$–$C_4$ alkyl)-thionothiol-phosphonic acid-S-(4-chlorophenylmercapto-cyanomethyl) ester, and the like, and of course such kinds of compounds possess the pesticidal activity in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphorus-containing thio esters of the general formula

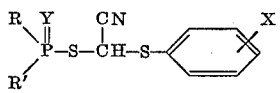

in which R and R' each respectively is a member selected from the group consisting of $C_1$–$C_4$ alkyl, $C_1$–$C_4$ alkoxy, mononuclear aryl having 6 ring carbon atoms, mononuclear chloro-substituted aryl having 6 ring carbon atoms, and mononuclear $C_1$–$C_4$ alkyl-substituted aryl having 6 ring carbon atoms, X is selected from the group consisting of hydrogen, chloro, bromo and lower alkyl, and Y is selected from the group consisting of oxygen and sulfur.

2. Phosphorus-containing thio esters of the general formula

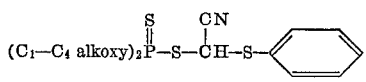

3. Phosphorus-containing thio esters of the general formula

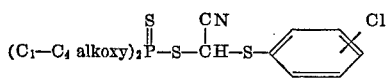

4. Phosphorus-containing thio esters of the general formula

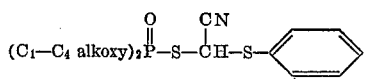

5. Phosphorus-containing thio esters of the general formula

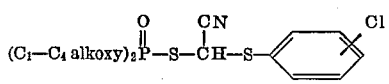

6. Phosphorus-containing thio esters of the general formula

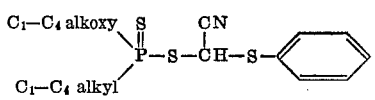

7. Phosphorus-containing thio esters of the general formula

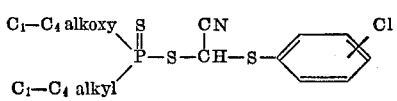

8. Phosphorus-containing thio esters of the general formula

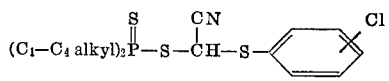

9. Phosphorus-containing thio esters of the general formula

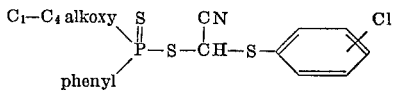

10. O,O-diethyl-thionothiol-phosphoric acid-S-(phenylmercapto-cyanomethyl) ester having the formula

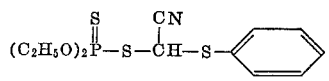

11. O,O-diethyl-thionothiol-prosphoric acid-S-(4-chlorophenylmercapto-cyanomethyl) ester having the formula

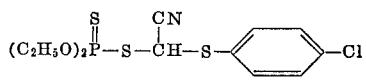

12. O,O-diethyl-thiol-phosphoric acid-S-(phenylmercapto-cyanomethyl) ester having the formula

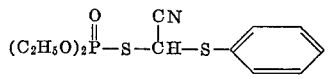

13. O,O-diethyl-thiol-phosphoric acid-S-(4-chlorophenylmercapto-cyanomethyl) ester having the formula

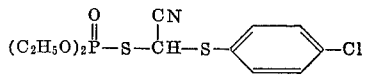

14. Ethyl-O-ethyl-thionothiol-phosphonic acid-S-(phenylmercapto-cyanomethyl) ester having the formula

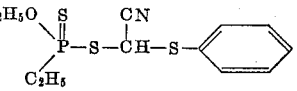

15. Ethyl-O-ethyl-thionothiol-phosphonic acid-S-(4-chlorophenylmercapto-cyanomethyl) ester having the formula

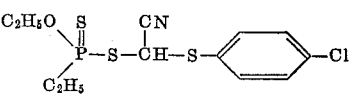

16. Diethyl-thionothiol-phosphinic acid-S-(4-chlorophenylmercapto-cyanomethyl) ester having the formula

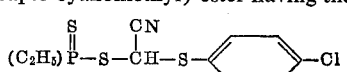

17. Phenyl-O-ethyl-thionothiol-phosphonic acid-S-(4-chlorophenylmercapto-cyanomethyl) ester having the formula

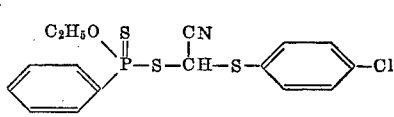

References Cited

UNITED STATES PATENTS

| | | | |
|---|---|---|---|
| 2,494,284 | 1/1950 | Cassaday et al. | 260—940 XR |
| 2,815,312 | 12/1953 | Schuler | 260—940 XR |
| 2,754,242 | 7/1956 | Kosolapoff | 167—30 |
| 2,818,368 | 12/1957 | Kosmin | 167—30 |
| 2,945,054 | 7/1956 | McCall et al. | 260—461 |
| 2,965,664 | 12/1960 | Butler | 260—461 |

CHARLES B. PARKER, *Primary Examiner.*

A. H. SUTTO, *Assistant Examiner.*

UNITED STATES PATENT OFFICE
CERTIFICATE OF CORRECTION

Patent No. 3,408,425  October 29, 1968

Hans-Gerd Schicke et al.

It is certified that error appears in the above identified patent and that said Letters Patent are hereby corrected as shown below:

Column 6, lines 30 to 34, the upper-left radical of the structural formula reading "$Ch_2O$" should read -- $CH_3O$ --. Column 7, line 39, "about" should read -- after --. Column 10, lines 50 to 53, the left radical of the structure formula reading "$(C_2H_5)$" should read -- $(C_2H_5)_2$ --.

Signed and sealed this 10th day of March 1970.

(SEAL)
Attest:

Edward M. Fletcher, Jr.  WILLIAM E. SCHUYLER, JR.
Attesting Officer  Commissioner of Patents